June 26, 1923.

T. C. LACKLAND

WHEEL

Filed Jan. 27, 1922

T. C. Lackland,
INVENTOR

BY Victor J. Evans
ATTORNEY

WITNESS:

June 26, 1923.

T. C. LACKLAND

WHEEL

Filed Jan. 27, 1922

T. C. Lackland
INVENTOR

BY Victor J. Evans
ATTORNEY

WITNESS:

Patented June 26, 1923.

1,460,253

UNITED STATES PATENT OFFICE.

THOMAS C. LACKLAND, OF ATLANTA, GEORGIA.

WHEEL.

Application filed January 27, 1922. Serial No. 532,116.

*To all whom it may concern:*

Be it known that I, THOMAS C. LACKLAND, a citizen of the United States, residing at Atlanta, in the county of Fulton and State of Georgia, have invented new and useful Improvements in Wheels, of which the following is a specification.

This invention aims to provide an improved wheel for motor operated vehicles, the construction being such as to permit of the use of a solid tire, supported by a cushioning means which affords the wheel all the desired resiliency, and at the same time eliminates to a marked degree the trouble usually experienced with pneumatic tires, incident to punctures and blow outs.

More specifically stated, the invention embodies opposed disk like members designed to unitedly define a tube receiving chamber to accommodate a pneumatic cushioning member made up of a plurality of inflatable units, which are arranged to support the solid tire in a manner to afford the wheel in its entirety the proper resiliency, and at the same time provide a structure which is puncture proof.

Another object of importance resides in the provision of a wheel of the above mentioned character, wherein the solid tire is formed with spaced ribs or projections adapted to be received by pockets or indentations formed in one of the disk members to prevent circumferential movement of the tire in regard to the wheel.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, wherein:—

Figure 1:
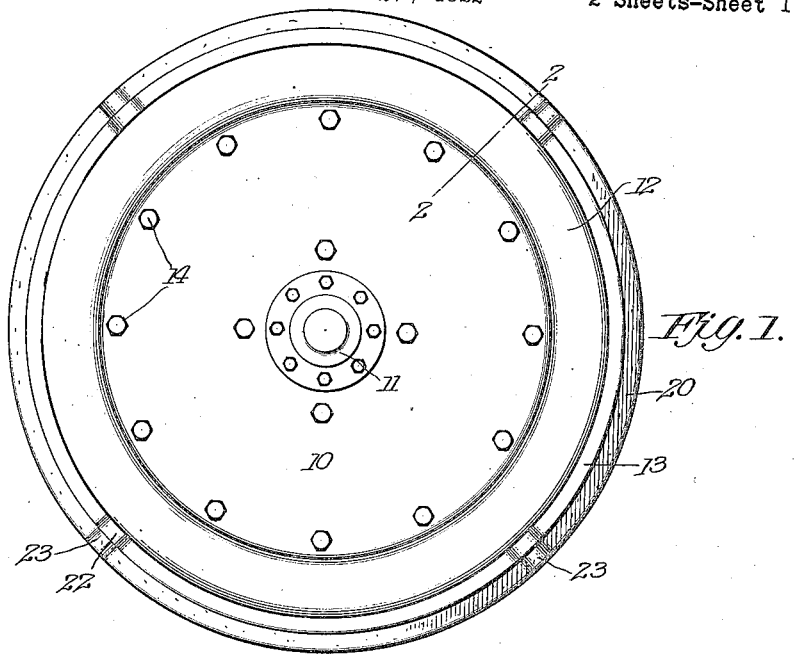
Figure 1 is a side elevation of a wheel constructed in accordance with the present invention.
Figure 3:
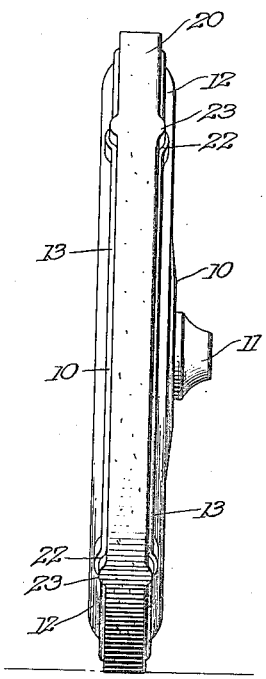
Figure 3 is a fragmentary sectional view, showing the manner in which the solid tire is held against circumferential movement with relation to the wheel.
Figure 2:
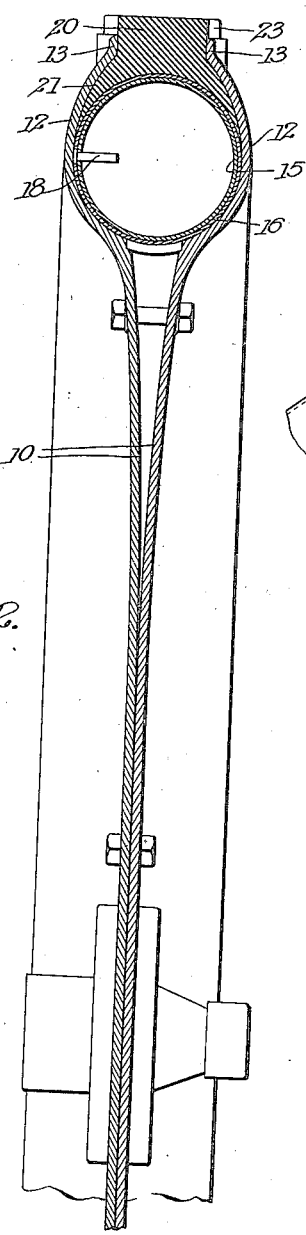
Figure 2 is a sectional view taken on line 2—2 of Figure 1.
Figure 4:
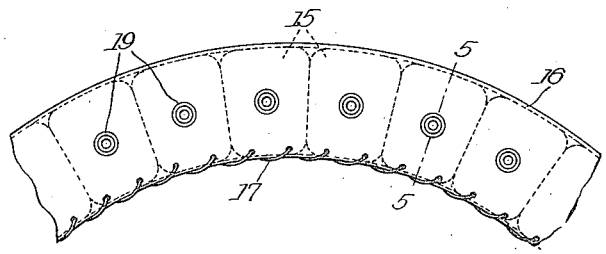
Figure 4 is a detail view of the cushioning member.
Figure 5:
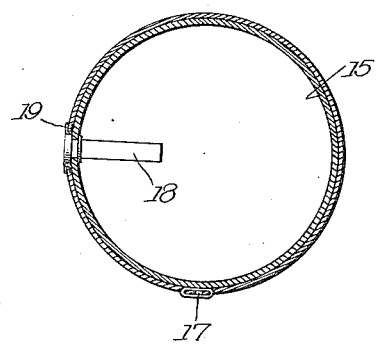
Figure 5 is a detail view of one of the inflatable units forming part of the cushioning member.

The wheel constructed in accordance with the present invention includes two metallic disk like members 10 which are centrally connected by means of the hub 11, the said disks being divergently disposed from the hub and terminating to provide opposed bulged portions 12 which unitedly define a chamber for the reception of the cushioning member to be hereinafter described. Each bulged portion 12 terminates to provide a circumferential flange 13. The disks 10 are also connected together at appropriate points by means of bolts or other suitable fastening elements 14.

The inflatable member above referred to is made up of a plurality of inflatable units or air cells 15 which are arranged side by side and positioned within a fabric casing 16 the latter having its free ends lapped or otherwise suitably secured together as at 17. Each inflatable unit is provided with a valve stem 18 which passes through an eyelet 19 in the fabric casing 16, there being one of these eyelets for each inflatable unit as will be readily understood. The cushioning member in its entirety is arranged within the chamber above referred to, which is defined by the intervening space between the bulged portions 12 of the disks 10. This member provides a cushioning means for a solid tire indicated at 20, the tire being arranged between the flanges 13 of said disks, and including a portion 21 which is arranged within said chamber to repose upon the cushioning member 16, the portion 21 being of a configuration to conform to the curvature of the cushioning member as illustrated. The flanges 13 are formed with pockets 22 arranged at diametrically opposite points, which pockets are designed to receive ribs 23 formed on the solid tire 20, so that when the latter is associated with the disks 10, or in other words, placed in position for use, it is held against circumferential movement with relation to the wheel. By reason of this construction and arrangement of parts, it is manifest that the tire is made puncture proof although the solid tire is afforded the same resiliency as possessed by a pneumatic tire, as it is supported by a cushioning member above referred to. Inasmuch as the cushioning member is made up of a plurality of inflatable units or air cells, it is obvious that should one or more of these units become impaired, the remaining units would spread out within the fabric casing 16 to fill up the space left vacant by the impaired units.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. A wheel comprising opposed disk like members formed to provide an annular chamber, a cushioning member made up of a plurality of inflatable units arranged side by side, a fabric casing enclosing all of said units, a valve stem casing wholly disposed within each unit and horizontally disposed, said valve stem casing being wholly concealed from view by one wall of said chamber, and a solid tire supported by said cushioning member and arranged between the walls of said chamber.

2. A wheel comprising opposed disk like members formed to provide an annular chamber, a cushioning member arranged within the chamber and including a plurality of inflatable units arranged side by side, a valve stem casing arranged in each unit and having one end projected through an opening therein to lie flush with the exterior surface of said unit, a fabric casing enclosing all of said units and holding them in proper relation to each other, said casing having an opening for each valve stem to permit access to be had to the latter, said opening being in alinement with the valve stem, one of the side walls of said chamber covering said openings, and a solid tire reposing upon the cushioning member and arranged between the walls of said chamber.

In testimony whereof I affix my signature.

THOMAS C. LACKLAND.